United States Patent [19]

Dabney

[11] 4,352,179

[45] Sep. 28, 1982

[54] TIME DOMAIN MULTIPLEXING APPARATUS FOR MULTIPLE MICROPHONES

[76] Inventor: James H. Dabney, 2700 Peterson Way, Apt. 45 "B", Costa Mesa, Calif. 92626

[21] Appl. No.: 55,612

[22] Filed: Jul. 9, 1979

[51] Int. Cl.³ .............................................. H04J 3/02
[52] U.S. Cl. ..................................... 370/6; 370/100; 370/114
[58] Field of Search ................. 370/6, 77, 100, 114, 370/112; 179/1 GQ, 1 G

[56] References Cited

U.S. PATENT DOCUMENTS

| | | | |
|---|---|---|---|
| 2,468,058 | 4/1949 | Grieg | 370/6 |
| 3,065,302 | 11/1962 | Kaneko | 370/100 |
| 3,340,364 | 9/1967 | Brightman et al. | 370/6 |
| 3,375,329 | 3/1968 | Prouty | 179/1 GQ |
| 4,093,825 | 6/1978 | Gladstone et al. | 370/100 |

*Primary Examiner*—Douglas W. Olms
*Attorney, Agent, or Firm*—Willie Krawitz

[57] ABSTRACT

A multiplexer is employed for connecting a plurality of microphones and sending an encoded signal over a single line where it is then decoded, filtered and processed such as by amplification.

The multiplexer switches from one microphone channel to the next over an eight channel track, typically at about $2 \cdot 10^6$ times/second, and produces a sample duration of about 0.5 microseconds for each channel. Cross talk is reduced by means of a blanking signal which causes the multiplexer to terminate a sample pulse about 120 nanoseconds prior to the onset of a succeeding pulse; this produces a distinct cut-off between sample pulses.

A synchronizing pulse at the end of the last (i.e. eighth) channel terminates each eight channel domain switch over to produce a scan cycle. This is combined with a clock signal in a data encoding circuit.

The synchronizing pulse, sample pulse and blanking signal are then fed to a signal decoder which, after filtering, converts the sample pulse back to a discrete (i.e. continuous) signal, with only about 0.05% distortion, for final amplification.

12 Claims, 7 Drawing Figures

TIME DOMAIN MULTIPLEXING APPARATUS FOR MULTIPLE MICROPHONES

BACKGROUND OF THE INVENTION

This invention relates to a multiplexer for a plurality of audio sources that may be used to feed an audio mixer, amplifiers, or recording devices.

The common practice of amplifying a musical concert involves feeding a plurality of microphones on the concert stage through their individual lines, which can extend to over a hundred feet, to a mixer located in the audience. At the mixer, the musical instruments and vocalists are then amplified, equalized and otherwise modified etc., to achieve optimum results in terms of audience effect, artist capability, musical quality and so forth.

Various problems arise when using long lines or cables from each microphone to the mixer, the first problem being the weight and expense of these cables which can amount to 100 pounds or more. Also, if one of these cables or its connections become damaged or badly worn, the quality of the transmitted signal will be impaired. In addition, source loading and signal attenuation become significant problems when using long microphone cables, even if the cable and its connections remain intact.

Another problem involves loss of recording fidelity because of non-uniform signal attenuation. Overall, desireable characteristics when transmitting an audio signal include high signal/noise ratio, wide bandwidth, low distortion, and a predictable signal output. If an audio signal is multiplexed, the sample frequency must be suppressed, and a fast sample time must be utilized. In the case of audio signals, the frequency response loss should not be affected by the cable.

THE INVENTION

According to the invention, analog signals received by a plurality of sources such as microphones are fed to a multiplexer where they are sampled and encoded. As an example, using an eight channel source, the multiplexer is switched from channel-to-channel at a high rate of speed, about $2 \times 10^6$ times/second, to produce a sample pulse of about 0.5 microsecond duration for each channel. A sample window terminated by a blanking pulse, is produced for each channel count and the sample pulse is aligned with its digitized channel number. The blanking pulse signal is employed to produce a distinct cut-off between pulses, and this reduces cross talk.

The sample pulse, synchronizing pulse and a clocking signal are then fed along a single, commercial microphone cable from the multiplexer to a demultiplexer where the sample pulse is decoded and converted to the discrete analog signal, filtered to remove residual clock signals and then amplified to appropriate levels for subsequent equipment amplification with minimal distortion.

In addition to minimal distortion, the system will reject CB and rf interference and significantly reduce noise. Also, much of the expensive, bulky and heavy microphone cables which heretofore have been employed are considerably reduced and physically simplified. This in turn reduces the problem of determining which particular line might be at fault if a defect occurs. Typically, a 16 channel, 100 foot cable system requires 4,800 feet of wire, whereas the present system requires only 600 feet of wire, an 87.5% reduction. The system also eliminates the need for large numbers of transformers, 3 pin connectors and reduces cabling connections when used with high impedance sources.

When employing the system of this invention, a stereo tri-amp system can be installed with the cross overs located at the mixer, and this allows balance control during a performance using only one microphone cable. Also, using the system of this invention, remote recording at high fidelity is greatly facilitated. Furthermore, expansion of an existing amplifier arrangement using the system of this invention can be done simply and quickly without a costly new cable installation.

DESCRIPTION OF THE PREFERRED EMBODIMENT

Figure 1:
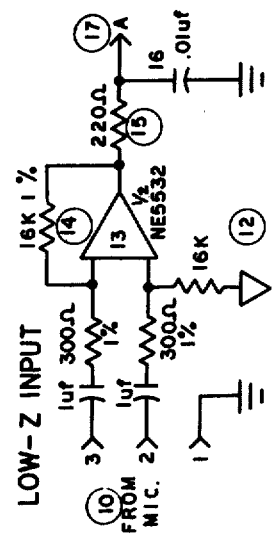
Figure 1A:
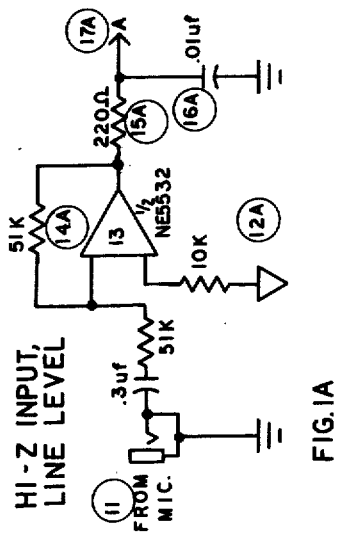

FIGS. 1, 1A show the multiplexer system of the invention for amplifying audio signals from a plurality of microphones, two of which, 10 and 11 are shown. The signals are fed to an input preamplifier circuit 12, 12A employing an operational amplifier 13. 13A with an inverting feedback resistor 14, 14A. An RC low pass filter 15, 15A, 16, 16A is employed at the output of the preamplifier 12, 12A to remove high frequencies exceeding 25 KHz.

Figure 2:
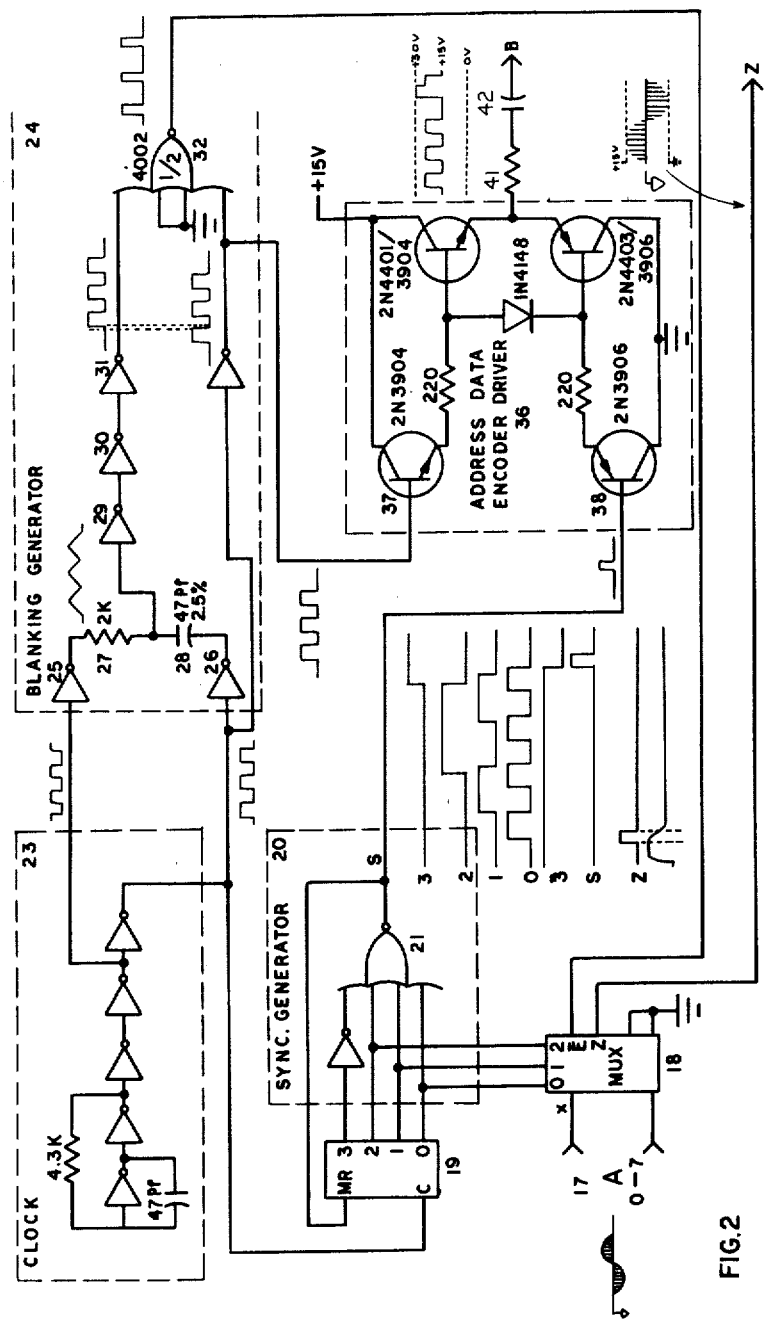

The amplified and filtered signals from, say, eight microphones are then fed through their respective lines or channels 17 to a multiplexer 18 (FIG. 2). The multiplexer switches from channel to channel at about $2 \times 10^6$ times/second (a useful range being $1.5-2.3 \times 10^6$) over the eight channels and encodes the analog signal as an instantaneous voltage sample having a sample rate of about 225–275 KHz and a pulse duration of about 400–670 nanoseconds, with 500 nanoseconds being preferred.

A counter 19 is employed to drive both the multiplexer and a synchronizing generator 20 for producing a pulse superimposed at the end of each eight complete sample cycles. A logic gate 21 is also driven by the counter to produce the digital sequencing logic and reset the multiplexer.

A clock generator (RC, crystal, oscillator, etc.) 23 drives the counter 19 and also a blanking pulse generator 24. Usually, the trailing edge of each sample window and the leading edge of a succeeding sample window tend to overlap, the overlap area giving rise to cross talk. The blanking pulse causes the multiplexer to terminate a sample pulse about 100–200 nanoseconds, and preferably 120 nanoseconds prior to the onset of a succeeding sample pulse; this arrangement virtually eliminates cross talk. Typically, a blanking pulse is applied to an overlap area of about 120 ns, the open period of the sample window being about 380 ns, with a useful range of sample pulse + blanking pulse being about 400–670 ns. Use of a blanking pulse between sampling windows permits high speed and low distortion sampling where otherwise a slower speed but lower quality output would be required to avoid cross talk.

Inverted square wave pulses from the clock generator 23 are fed to the blanking pulse generator 24 where they are converted to a phase shifted, triangle form by inverters 25, 26 and the RC phase shift network 27, 28.

The triangle wave is then converted back to a phase shifted, square wave form by inverters 29, 30 and 31, and fed with an inverted clock pulse into the logic circuit 32. Since the inverted clock pulse is now slightly behind in phase, subtraction in the logic circuit produces a blanking pulse of short duration which is fed into the multiplexer for creating blanking between each sample pulse. The blanking pulse functions to initiate the trailing edges of successive sample pulses from the multiplexer about 120 nanoseconds from the preceding sample pulse, and thus prevents sample pulse overlap; this in turn greatly reduces cross talk (on the order of 40 db).

Figure 3:
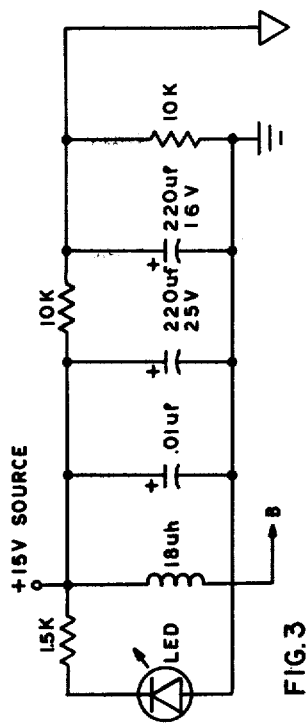
FIGS. 1A and 1-6 are circuit diagrams showing the multiplexer-demultiplexer apparatus for a plurality of microphones according to the invention.
Figure 4:
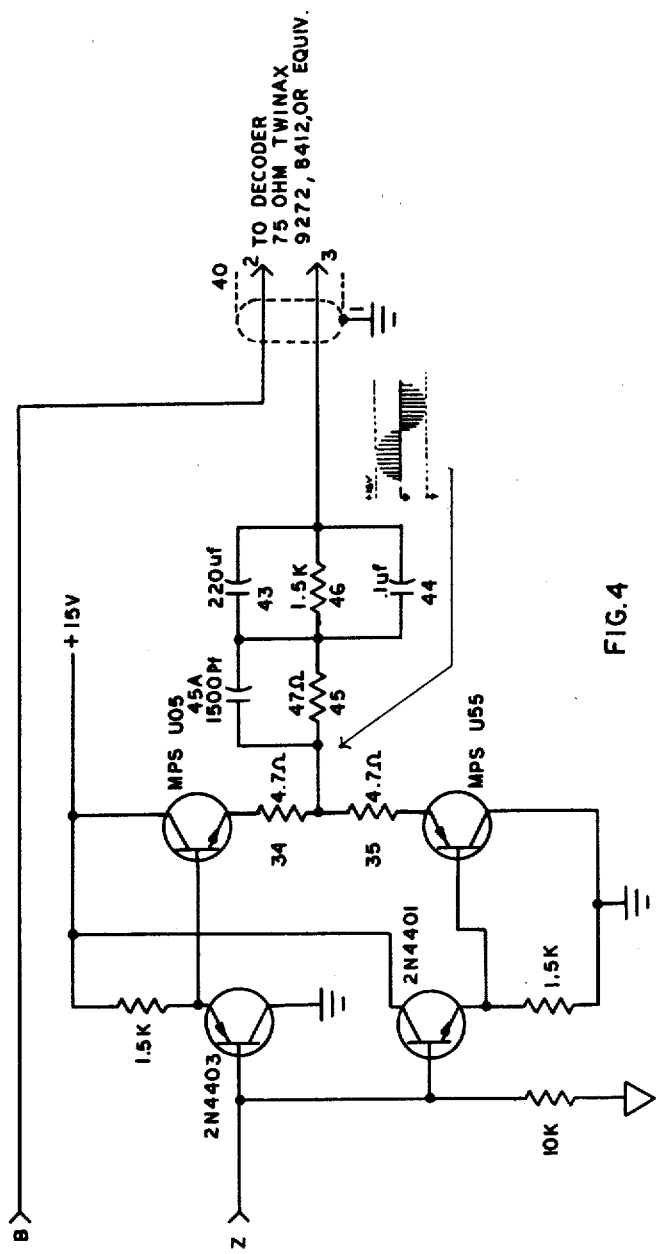

The multiplexed signal, over which the blanking pulse is imposed, is then amplified by a complementary push-pull video type amplifier (FIG. 4) which has no voltage gain but produces low noise and distortion and a useable power bandwidth of about 50 MHz; resistances 34, 35 are employed to provide thermal stability. Simultaneously, the clock signal and synchronizing generating pulses are fed to an address data encoder 36 which comprises an emitter-follower circuit to produce a controlled linear amplification. The sync. pulse is added to the clock by transistors 37, 38 (which function as a linear mixer) and superimposed on the pulse at the end of each scan cycle. A typical height difference between a pulse maximum and the sync. pulse is about 7 volts. Power for the address encoding module is provided by a d.c. power supply (FIG. 3) which delivers its power on the address data line from the decoder and is inductor decoupled.

Cable 40 is operated as a transmission line for which resistance 41 provides an appropriate source impedance; decoupling is provided by a capacitor 42. The multiplexed signal is passed through a line terminating network of decoupling capacitors 43, 44 and a resistance 45; a resistance 46 enables a small bias to be applied to subsequent amplification and demultiplexing stages. A capacitor 45A is used to increase the rise time in the transmission line.

Figure 5:
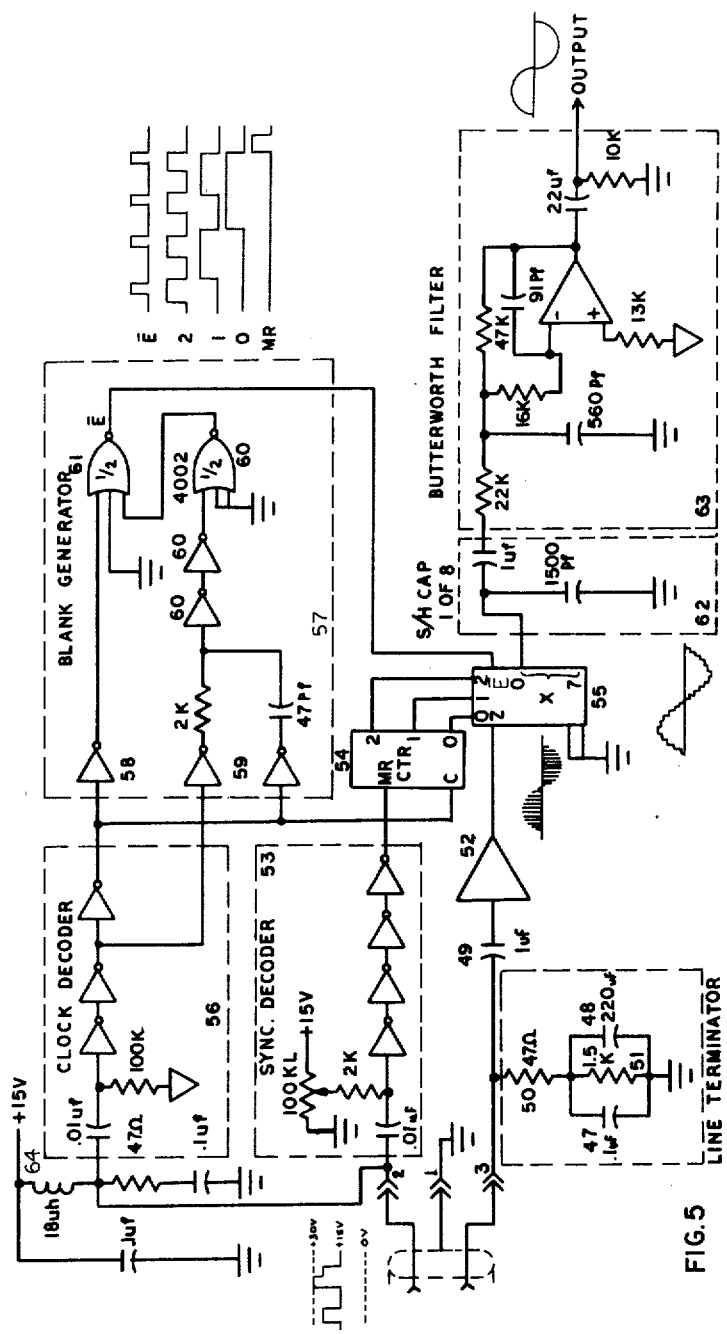

Leaving the encoder, the line is conditioned prior to feeding through an extended line (25–1,000 feet) to a demultiplexer (FIG. 5) at the mixing or amplifying equipment usually located in the audience. At line termination at the demultiplexer, it is decoupled through capacitors 47, 48 and 49, and conditioned by resistance 50. A resistance 51 produces the proper bias for capacitor 48. A video type amplifier 52 amplifies the signal to overcome line and transmission on losses. The amplifier 52 thus functions as a repeater and also buffers the input cable from the demultiplexer. The overall effect is to properly feed and terminate the transmission line thereby allowing transmission of the high frequency signal.

The superimposed sync and clock pulses are sent through a sync decoder circuit 53 and then to a counter 54 which drives the demultiplexer 55. The counter 54 itself is driven from a clock decoder 56 which also drives a phase shift and blanking generator 57. The clock decode feeds a logic circuit 58, a phase shifter 59 and a squaring circuit 60. Subtraction in a logic circuit 61 produces a blanking signal in a similar manner as at the multiplexer.

Figure 6:
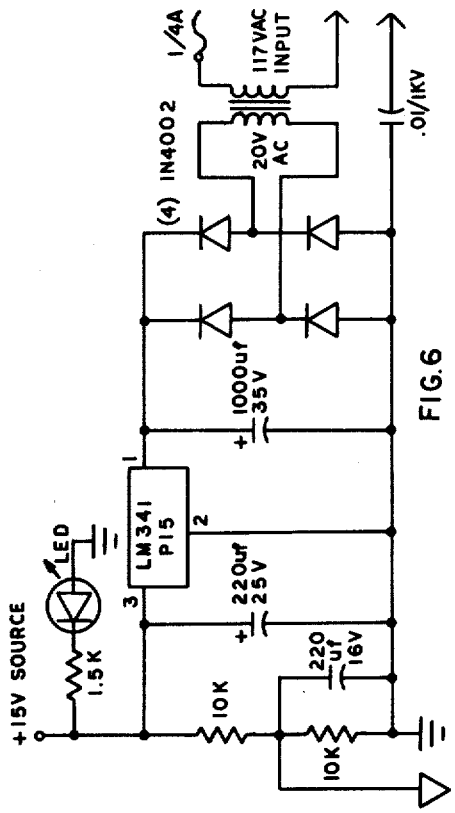

The demultiplexer and capacitor 62 form a sample and hold circuit, only one of eight being shown. The sample and hold circuit produce a composite analog signal at its output, which is then filtered through a two pole, multiple feedback, low pass Butterworth filter 63 to remove the high frequency components of the signal due to sampling and frequencies above about 25 KHz. The output signal with only about 0.05% distortion, is then processed for various uses. Power for the system is provided by a DC power supply (FIG. 6) driven from an AC source, the power being coupled by an inductor 64 to the power line.

The present invention provides a lightweight system for replacing the cumbersome and expensive multiple microphone cables previously employed for musical concert purposes, and the like. The distortion, as noted, is quite low, and ease of replacement of damaged cords is greatly simplified.

The circuit components may be used in discrete form as shown in the drawings or may be incorporated into a chip, such as a hybrid IC. Typical operating parameters using the components and values in the drawings are as follows:

|  | HiZ | LowZ | RETURN |
|---|---|---|---|
| MAXIMUM OUTPUT LEVEL | +10 dBm | +10 dBm | +10 dBm |
| FREQUENCY RESPONSE | 20 Hz–20 KHz; 0–2 dB | | |
| OUTPUT IMPEDANCE | 500 OHMS NOMINAL | | |
| THD + HUM + NOISE | 0.12% MAX, 0.06% TYPICAL | | |
| CROSS TALK AT WORST | −60 dB | −60 dB | −60 dB |
| CROSS TALK, TYPICAL | −75 dB | −75 dB | −75 dB |
| S/N + HUM (10 dBm) | −100 dB | −100 dB | −100 dB |
| POWER CONSUMPTION | 50 to 130 VAC @ 50 to 60 Hz, 7 WATTS | | |

I claim:

1. A time domain multiplexer for feeding an analogue signal input from a plurality of signal sources along a transmission line, comprising:
   a. a multiplexer connected by a channel line to each signal source for channel-to-channel switching at switching speeds of about $1.5–2.3 \times 10^6$ times/second to produce a sample train from the separate channel signals and convert the analog signals to sample pulses at an individual sample rate of about 225 KHz–275 KHz;
   b. blanking generator means for producing a time delay of about 100–200 ns between successive sample pulses to prevent sample pulse overlap, thereby reducing cross talk;
   c. means to superimpose a synchronizing pulse at the end of each complete sample cycle;
   d. a counter for driving the multiplexer and a demultiplexer;
   e. a clock generator for producing a clock signal superimposed on the sample cycle and for driving the counters and blanking generator, each sample cycle being identified by a clock signal and synchronizing pulse;
   f. means for amplifying and driving the synchronizing pulse, clock signal and sample pulse along the transmission line; and,
   g. a demultiplexer for converting the sample pulses to continuous and discrete analog signals, the demultiplexer being driven by decoders for the synchronizing pulses and clock signal pulses.

2. A time domain multiplexer for feeding an audio signal input from a plurality of audio signal sources along a single wire, comprising:

a. a multiplexer connected by a channel input to each audio signal source for channel-to-channel switching at switching speeds of about $1.5-2.3 \times 10^6$ times/second to produce a sample pulse train from the separate channel signals and to convert audio analog signals to sample pulses at an individual sample rate of about 225 KHz–275 KHz;
b. blanking generator means for producing a time delay of about 100–200 ns between sample pulses, thereby reducing cross talk;
c. means to superimpose a synchronizing pulse at the end of each complete sample cycle;
d. a counter for driving the multiplexer and a demultiplexer;
e. a clock generator for producing a clock signal superimposed on the sample cycle and for driving the counters and blanking generator, each sample cycle being identified by a clock signal and synchronizing pulse;
f. means for amplifying and driving the synchronizing pulse, clock signal and sample pulse along the wire;
g. a demultiplexer for converting the sample pulses to continuous and discrete analog signals, the demultiplexer being driven by decoders for the synchronizing pulses and clock signal pulses; and,
h. filtering means for converting the demultiplexed analog signals to continuous and discrete analog signals.

3. The time domain multiplexer of claim 2, in which the audio signal sources are a plurality of microphones.

4. The multiplexer of claim 2 in which the channel-to-channel switching occurs at about $2 \times 10^6$ times/second.

5. The multiplexer of claim 2 providing a sample duration of about 0.5 microsecond.

6. The multiplexer of claim 2 in which the sample and blanking pulses have a duration of about 400–670 nanoseconds.

7. The multiplexer of claim 2 in which the blanking pulse initiates a succeeding sample pulse by about 120 nanoseconds.

8. The multiplexer of claim 2 in which the channel-to-channel switching speeds vary from about $1.5-2.3 \times 10^6$ times/second, at an individual sample rate of about 225 KHz–275 KHz and with a pulse duration varying from about 400–670 nanoseconds.

9. The multiplexer of claim 2 including a Butterworth filter for conversion of the demultiplexed signals to analog signals.

10. The multiplexer of claim 9 in which the filter is a two pole, multiple feedback, low pass, Butterworth filter.

11. The multiplexer of claim 2 in which cross talk is reduced by about 40 dB.

12. The multiplexer of claim 2 in which the synchronizing pulse is superimposed on the last pulse of a complete sample cycle.

* * * * *